US012644055B2

(12) United States Patent
Zacher et al.

(10) Patent No.: US 12,644,055 B2
(45) Date of Patent: Jun. 2, 2026

(54) CARBON DIOXIDE ENHANCED HYDROTHERMAL LIQUEFACTION

(71) Applicant: Battelle Memorial Institute, Richland, WA (US)

(72) Inventors: Alan H. Zacher, Pasco, WA (US); Lisa A. Middleton-Smith, Pasco, WA (US); Todd R. Hart, Kennewick, WA (US); Andrew J. Schmidt, Richland, WA (US); Michael R. Thorson, Richland, WA (US); Samuel P. Fox, West Richland, WA (US); Dylan J. Cronin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 220 days.

(21) Appl. No.: 18/434,609

(22) Filed: Feb. 6, 2024

(65) Prior Publication Data

US 2024/0287390 A1      Aug. 29, 2024

Related U.S. Application Data

(60) Provisional application No. 63/443,512, filed on Feb. 6, 2023.

(51) Int. Cl.
| | |
|---|---|
| *C02F 11/18* | (2006.01) |
| *B01J 4/00* | (2006.01) |
| *B01J 8/08* | (2006.01) |
| *C10G 3/00* | (2006.01) |

(52) U.S. Cl.
CPC ................ *C10G 3/40* (2013.01); *B01J 4/007* (2013.01); *B01J 8/085* (2013.01); *B01J 8/087* (2013.01); *C02F 11/18* (2013.01); *B01J 2204/002* (2013.01); *B01J 2208/00168*

(2013.01); *B01J 2208/00752* (2013.01); *C10G 2300/1003* (2013.01); *C10G 2300/1014* (2013.01)

(58) Field of Classification Search
CPC ... C10G 3/40; B01J 4/007; B01J 8/085; B01J 8/087; C02F 11/18
See application file for complete search history.

(56) References Cited

U.S. PATENT DOCUMENTS

| | | | |
|---|---|---|---|
| 11,505,772 B1 * | 11/2022 | Perry | C12M 41/22 |
| 2017/0166819 A1 * | 6/2017 | Choi | C10B 57/06 |
| 2021/0284916 A1 * | 9/2021 | Iversen | C10G 3/50 |
| 2024/0191143 A1 * | 6/2024 | Bobbili | C10G 3/50 |
| 2024/0400910 A1 * | 12/2024 | Engelthon | C10G 53/04 |

(Continued)

FOREIGN PATENT DOCUMENTS

| WO | WO-2016036948 A1 * | 3/2016 | C10G 1/002 |
|---|---|---|---|

OTHER PUBLICATIONS

Elliott, D.C., P. Biller, A.B. Ross, A.J. Schmidt, S.B. Jones, "Hydrothermal liquefaction of biomass: Developments from batch to continuous process", Bioresource Technol, 178 (2015) 147-156.

(Continued)

*Primary Examiner* — Tam M Nguyen
(74) *Attorney, Agent, or Firm* — Derek H. Maughan; Frank Rosenberg

(57) ABSTRACT

A process where a liquid or supercritical CO2 co-solvent is used in a hydrothermal liquefaction (HTL) process. The process improves yield of the HTL process.

18 Claims, 3 Drawing Sheets

(56) References Cited

U.S. PATENT DOCUMENTS

2025/0320428 A1* 10/2025 Floan ..................... C11B 3/006

OTHER PUBLICATIONS

Snowden-Swan, L.J., J.M. Billing, M.R. Thorson, A.J. Schmidt, Y. Jiang, D.M. Santosa, T.E. Seiple, R.C. Daniel, C. A. Burns, S. Li, "Wet Waste Hydrothermal Liquefaction and Biocrude Upgrading to Hydrocarbon Fuels: 2020 State of Technology", Pacific Northwest National Lab.(PNNL), Richland, WA (United States), 2021.

Yuan, X.Z., J.Y. Wang, G.M. Zeng, H.J. Huang, X.K. Pei, Z.F. Liu, M.H. Cong, "Comparative studies of thermochemical liquefaction characteristics of microalgae using different organic solvents", Energy, 36 (2011) 6406-6412.

Zhang, J.X., W.T. Chen, P. Zhang, Z.Y. Luo, Y.H. Zhang, "Hydrothermal liquefaction of Chlorella pyrenoidosa in sub-and supercritical ethanol with heterogeneous catalysts", Bioresource Technol, 133 (2013) 389-397.

Huang, H.J., X.Z. Yuan, G.M. Zeng, J.Y. Wang, H. Li, C.F. Zhou, X.K. Pei, Q.A. You, L.A. Chen, "Thermochemical liquefaction characteristics of microalgae in sub- and supercritical ethanol", Fuel Process Technol, 92 (2011) 147-153.

Jin, B.B., P.G. Duan, C.C. Zhang, Y.P. Xu, L. Zhang, F. Wang, "Non-catalytic liquefaction of microalgae in sub-and supercritical acetone", Chem Eng J, 254 (2014) 384-392.

Reddy, H.K., T. Muppaneni, P.D. Patil, S. Ponnusamy, P. Cooke, T. Schaub, S.G. Deng, "Direct conversion of wet algae to crude biodiesel under supercritical ethanol conditions", Fuel, 115 (2014) 720-726.

Singh, R., T. Bhaskar, B. Balagurumurthy, "Effect of solvent on the hydrothermal liquefaction of macro algae Ulva fasciata", Process Saf Environ, 93 (2015) 154-160.

Montesantos, N., T.H. Pedersen, R.P. Nielsen, L. Rosendahl, M. Maschietti, "Supercritical carbon dioxide fractionation of bio-crude produced by hydrothermal liquefaction of pinewood", J Supercrit Fluid, 149 (2019) 97-109.

Yi, W., D Zheng, X. Wang, Y. Chen, J. Hu, H. Yang, J. Shao, S. Zhang, H. Chen, Biomass Hydrothermal conversion under CO2 atmosphere: A way to improve the regulation of hydrothermal products, Science of the Total Environment, 807 (2022).

Montesantos, N et al. "Supercritical Carbon Dioxide Extraction of Lignocellulosic Bio-Oils: The Potential of Fuel Upgrading and Chemical Recovery", Energies 2020, 13, 1600.

* cited by examiner

CARBON DIOXIDE ENHANCED HYDROTHERMAL LIQUEFACTION

RELATED APPLICATIONS

This application claims the benefit of U.S. Provisional Patent Application Ser. No. 63/443,512 filed 6 Feb. 2023.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

FIELD OF THE INVENTION

The present invention is directed to the problem of improving biocrude product yield and/or reducing byproduct yield from biomass.

INTRODUCTION

Hydrothermal liquefaction (HTL) is a process that can be used to thermochemically react biomass in the presence of water above 200° C. and 14 atm. The goal is to produce liquid biocrude for use as a liquid fuel or fuel precursor. Side products that are either waste or must be further treated include solids, noncondensable gases, and a separable aqueous liquid often containing soluble organics. Technoeconomic analysis indicates that increased biocrude yield and decreased byproduct yield will improve process economics.

Hydrothermal liquefaction (HTL) is a process that converts a wide range of biomass materials into 4 streams: a byproduct gas, a byproduct solid, a byproduct aqueous phase, and a liquid energy carrier called biocrude. See FIG. 1. This biocrude can be used directly as a fuel source, or be catalytically upgraded to a hydrocarbon fuel.

The HTL process has been subjected to over 30 years of worldwide research, and while the economics of the process continue to improve, it has not yet been adopted commercially. The current challenges to HTL commercialization include:

1) Maximization of biocrude yield: One process goal is to maximize yield of the biomass to the biocrude product while minimizing its yield to solids, gaseous, and organic contamination in the aqueous phase. Maximizing biocrude would increase process economics.

2) Minimization of solids byproduct: Byproduct solids represent both a yield loss and a complication of separations. Separation of solids increase operating expenses and complexity and are difficult to effectively separate via in situ and ex situ approaches. Solids removal techniques decrease system uptime and biocrude product is lost during solid removal. Reduced solids would improve biocrude recovery and lower operating expenses.

3) Minimizing aqueous solvent impact: Aqueous solvent is needed as it participates in the lysing of biomass to render it a liquid biocrude. It also reduces the biomass viscosity and dilutes biomass to avoid unwanted reactions, particularly in the heater unit operations. Additionally, the solvent reduces the viscosity of the feedstock where high viscosity requires large heat transfer surface area such that lower viscosity reduces the capital cost of heat-exchangers. However, as a diluent it complicates separations and results in yield losses when organics partition to the aqueous byproduct. It is needed for viscosity and diluent purposes in the front end, but it is present at higher than needed concentrations as a reaction solvent. Process economics could be improved by reducing concentration of aqueous solvent while maintaining the required hydrolysis chemistry and the beneficial impacts of viscosity reduction and dilution.

4) Minimization of plugging and unwanted reactions: During preheating, biomass can undergo unwanted reactions that form a solid that plugs the heater unit operations. Reduction of these unwanted reactions will result in better process uptime and reduce yield loss.

5) Effective liquid/liquid separation: Gravity separation of the biocrude from the aqueous phase is an ongoing challenge due to similar densities, similar polarities, and emulsifiers including solids (physical) and compounds (chemical.) This creates yield loss and equipment challenges as these separations also occur slowly and can result in insufficient separations purity.

HTL of biomass is a well-known process that has been reviewed in the literature, predominantly with water as the primary solvent[1] [2]. HTL in a co-solvent, namely its own biocrude, was reported early in research in the Albany Process around 40 years ago[1]. Our invention distinguishes itself from this body of work in that it uses CO2 as a co-solvent which has unexpectedly been found to produce superior results. Recent work in co-solvent HTL has been reported in multiple sources with a variety of liquid organic solvents[3-8]. The utility of $CO_2$ has been demonstrated for ex situ extraction of compounds from HTL biocrude product [9] and the use of $CO_2$ in the atmosphere of an HTL process can regulate the products [10].

REFERENCES

[1] D. C. Elliott, P. Biller, A. B. Ross, A. J. Schmidt, S. B. Jones, Hydrothermal liquefaction of biomass: Developments from batch to continuous process, Bioresource Technol, 178 (2015) 147-156.

[2] L. J. Snowden-Swan, J. M. Billing, M. R. Thorson, A. J. Schmidt, Y. Jiang, D. M. Santosa, T. E. Seiple, R. C. Daniel, C. A. Burns, S. Li, Wet Waste Hydrothermal Liquefaction and Biocrude Upgrading to Hydrocarbon Fuels: 2020 State of Technology, Pacific Northwest National Lab. (PNNL), Richland, WA (United States), 2021.

[3] X. Z. Yuan, J. Y. Wang, G. M. Zeng, H. J. Huang, X. K. Pei, Z. F. Liu, M. H. Cong, Comparative studies of thermochemical liquefaction characteristics of microalgae using different organic solvents, Energy, 36 (2011) 6406-6412.

[4] J. X. Zhang, W. T. Chen, P. Zhang, Z. Y. Luo, Y. H. Zhang, Hydrothermal liquefaction of Chlorella pyrenoidosa in sub- and supercritical ethanol with heterogeneous catalysts, Bioresource Technol, 133 (2013) 389-397.

[5] H. J. Huang, X. Z. Yuan, G. M. Zeng, J. Y. Wang, H. Li, C. F. Zhou, X. K. Pei, Q. A. You, L. A. Chen, Thermochemical liquefaction characteristics of microalgae in sub- and supercritical ethanol, Fuel Process Technol, 92 (2011) 147-153.

[6] B. B. Jin, P. G. Duan, C. C. Zhang, Y. P. Xu, L. Zhang, F. Wang, Non-catalytic liquefaction of microalgae in sub- and supercritical acetone, Chem Eng J, 254 (2014) 384-392.

[7] H. K. Reddy, T. Muppaneni, P. D. Patil, S. Ponnusamy, P. Cooke, T. Schaub, S. G. Deng, Direct conversion of wet algae to crude biodiesel under supercritical ethanol conditions, Fuel, 115 (2014) 720-726.

[8] R. Singh, T. Bhaskar, B. Balagurumurthy, Effect of solvent on the hydrothermal liquefaction of macro algae *Ulva fasciata*, Process Saf Environ, 93 (2015) 154-160.

[9] N. Montesantos, T. H. Pedersen, R. P. Nielsen, L. Rosendahl, M. Maschietti, Supercritical carbon dioxide fractionation of bio-crude produced by hydrothermal liquefaction of pinewood, J Supercrit Fluid, 149 (2019) 97-109.

[10] W. Yi, D Zheng, X. Wang, Y. Chen, J. Hu, H. Yang, J. Shao, S. Zhang, H. Chen, Biomass Hydrothermal conversion under $CO_2$ atmosphere: A way to improve the regulation of hydrothermal products, Science of the Total Environment, 807 (2022).

SUMMARY OF THE INVENTION

The invention comprises injecting liquid and/or supercritical $CO_2$ as a cosolvent into an HTL process as shown in FIG. 2. As $CO_2$ is a byproduct from the HTL process, the invention can be practiced by capturing the byproduct (and any reinjected) carbon dioxide, compressing it into a liquid or supercritical form, and injecting it into the feedstock at one or a plurality of locations through the process. Surprisingly, reinjection of the $CO_2$ as a liquid or supercritical co-solvent results in improved yield of desirable products. $CO_2$ is easily separable and it has acidic chemical solvent functionality. The injection increases biocrude product yield and/or decrease byproduct yield.

This injection of liquid (or supercritical) carbon dioxide into a hydrothermal liquefaction process can be performed in one or more of the feeding section, the preheating section, the reactor section, the product handling and collection section or other locations in the outlined process. The carbon dioxide is optionally obtained from the waste product gas from an HTL process. This invention, in various embodiments, provides advantages such as: improved product yield, reduced byproduct yield, and enhanced operation of HTL when carbon dioxide is injected into one or more unit operations into an HTL process. As a source of $CO_2$ is available from the HTL process byproduct gas, it can be easily collected, recompressed, and injected into the HTL system at various locations. This also enables simple recovery/recycle of the injected carbon dioxide as a normal function of HTL. This recovery also captures carbon dioxide in order to reduce atmospheric emission.

The HTL process is generally considered a form of aqueous solvent liquefaction, and the addition of $CO_2$ to the feedstock enables advantageous chemistry during the whole of the continuous process, including preheat, reaction, and separation. Additionally, having additional $CO_2$ present in the product handling section may also enable more efficient filtration, solid/liquid separation, liquid/liquid separation, and pressure let down. An advantage of this approach is that $CO_2$ could be sourced and recovered directly from the byproduct gas from HTL. $CO_2$ is formed in thermochemical reaction during liquefaction of biomass. The byproduct $CO_2$ could be compressed and injected into the feed end of the HTL process or at an intermediate reaction point. Other minor hydrocarbons in the $CO_2$ product gas are likely not to interfere with the solvating effect of $CO_2$. As the process has a net positive production of $CO_2$ even with recycle, minor hydrocarbons will still be able to be removed in a purge stream. As the injected $CO_2$ could be collected with the reaction product $CO_2$, this allows the ability to operate at any desired ratio of $CO_2$ solvent to biomass slurry.

Process locations where injection of carbon dioxide can be employed in HTL include:
1. Liquid $CO_2$ injection with biomass feed prior to preheaters
2. Supercritical injection into preheaters
3. Supercritical injection into preheated biomass between the preheater and the reactor
4. Injected into product between the reactor but before filtration, liquid separation, or let-down.

In one aspect, the invention provides a method of producing liquid biocrude comprising: providing an aqueous biomass slurry comprising biomass and water; adding liquid $CO_2$ or supercritical $CO_2$ to the slurry to form a slurry with $CO_2$ cosolvent; heating and pressurizing the slurry; reacting the slurry in a HTL process in the presence of the $CO_2$ cosolvent under conditions where the $CO_2$ cosolvent is in the form of a liquid or is supercritical; forming a product mixture from the step of reacting; cooling the product mixture to form a cooled product mixture; subjecting the cooled product mixture to a separation process; and recovering a liquid product from the separation process. The process is run in a continuous (rather than batch) process. Also, pH of the feedstock, the composition during preheating, or in the HTL reactor (where pH is difficult to measure) is preferably 4.2 or higher or 4.5 or higher. Preferred feedstocks for the invention do not require drying.

In another aspect, the invention provides a method of producing liquid biocrude comprising: providing an aqueous biomass slurry comprising biomass and water; adding $CO_2$ to the slurry to form a slurry with $CO_2$ cosolvent in which the mass ratio of $CO_2:H_2O$ is at least 0.02 or at least 0.05 or at least 0.10 or in the range of 0.05 to 0.40 or 0.10 to 0.30; heating and pressurizing the slurry; reacting the slurry in a HTL process in the presence of the $CO_2$ cosolvent under conditions where the $CO_2$ cosolvent; forming a product mixture from the step of reacting; cooling the product mixture to form a cooled product mixture; subjecting the cooled product mixture to a separation process; and recovering a liquid product from the separation process. Likewise, the composition and system can be characterized based on these mass ratios.

In another aspect, the invention provides a multi-phasic composition, comprising: a first phase comprising a mixture of biomass and liquid water (an aqueous biomass slurry); and a second phase comprising liquid CO2 or supercritical CO2; wherein the phases are in contact. In a further aspect, the invention provides an HTL system, comprising: a subsystem comprising: a vessel comprising an aqueous biomass slurry; a pump adapted to transfer the slurry into a preheater; and a reactor connected to the preheater wherein the reactor is adapted to conduct a hydrothermal reaction; a container of liquid CO2 and a conduit or conduits adapted to carry liquid CO2 into the subsystem.

In any of its aspects, the invention can be further characterized by one or any combination of the following: wherein the biomass comprises sewage sludge, food waste, algal biomass, agricultural residues, forest residues, or a combination of these materials; comprising a preheating step followed by a passing the preheated solution into a reactor where the step of reacting occurs; wherein the liquid or supercritical $CO_2$ is added to the slurry after the preheating step and before the reacting step; wherein the pressure in the reactor is in the range of 5 to 25 MPa; wherein the aqueous slurry is mechanically stirred in a preheater section prior to passage into a HTL reactor; wherein the separation process comprises a step of removing products in a stream of liquid $CO_2$ or supercritical $CO_2$; and wherein the stream of liquid $CO_2$ or supercritical $CO_2$ comes from the HTL process; wherein the pressure in the reactor is at least 10 MPa, or in the range of 10 to 100 MPa, or 10 to 50 MPa, or 12 to 30 MPa, or 13 to 20 MPa, or 10 to 15 MPa; where the step of reacting is conducted in the range of 300 to 370° C. or 350 to 370° C. or 300 to 330° C.; wherein the aqueous biomass slurry comprises at least 5 wt % biomass, or in the range of 5 to 50 wt % biomass, or 10 to 30 wt % biomass, or 15 to 25 wt % biomass; wherein the mass of added liquid $CO_2$ is at least 1.1 times to 4 times the mass of CO2 that is generated in the method; wherein the separation process comprises a step of $CO_2$ gas removal wherein at least 1% (or at least 3%, or at least 5%) of carbon in the added $CO_2$ is present in the liquid product after the step of $CO_2$ gas removal; wherein the preheating is conducted in a vessel that is separate from a vessel where the slurry is reacted in the HTL process, and wherein the preheating is conducted to a temperature of at least 150° C. or at least 200° C.; wherein liquid $CO_2$ is dispersed in the aqueous slurry; wherein the mass ratio of the added liquid $CO_2$ or supercritical $CO_2$ to the slurry is at least 0.01 or at least 0.03 or at least 0.05 and is 0.5 or less or 0.3 or less, or 0.1 or less; wherein the biocrude yield is at least 30%; or wherein the solids yield is 10% or less; wherein, as compared to a process that does not add $CO_2$ but is otherwise identical, the biocrude yield increases by at least 5% or at least 10% (for example, instead of 30 wt % yield, at least 33 wt % biocrude yield), or in the range of 5 to 20 to 5 to 15% increase; likewise, the method can be characterized by any of these increases relative to an identical method conducted in the presence of an atmosphere of $CO_2$ but no liquid or supercritical $CO_2$; wherein, as compared to a process that does not add $CO_2$ but is otherwise identical, the solids yield decreases by at least 5% or at least 10%, or in the range of 5 to 30 to 5 to 20% decrease. Likewise, the method can be characterized by any of these decreases relative to an identical method conducted in the presence of an atmosphere of $CO_2$ but no liquid or supercritical $CO_2$; wherein a second phase is dispersed in a first phase; wherein first and second phases are adjacent layers.

As is well known, biomass can be distinguished from carbon derived from fossil sources by the amount of $^{14}C$ present. Examples of biomass include agricultural waste, sewage, silage, grasses, rice hulls, bagasse, cotton, jute, hemp, flax, bamboo, sisal, abaca, straw, corn cobs, corn stover, switchgrass, alfalfa, hay, rice hulls, coconut hair, cotton, cassava, and cellulosic or lignocellulosic materials such as paper, wood, particle board, sawdust, and/or mixtures of these.

HTL experiments that co-injected liquid carbon dioxide with the biomass feed gave increased desired product yield and reduced nondesired byproduct yield. Carbon dioxide injection with the feed resulted in an increase in biocrude (product) yield and a decrease in solid (byproduct/waste product) yield. This demonstrates that carbon dioxide has a meaningful, positive impact on yield to desired products. The observation that added $CO_2$ increases yield of liquid biocrude product is surprising since a prior HTL study under atmospheric $CO_2$ at 330° C. did not observe a significant increase in yield, which was thought to occur since the added atmospheric $CO_2$ did not effect the acid catalytic effect at these conditions. The prior study operated at low pH of 3.9 or less. Use of atmospheric $CO_2$ to operate at these conditions resulted in the same or increased formation of solids, while we surprisingly observed lower solids.

Advantages of a small amount of $CO_2$ injection have been demonstrated, and improves some of the challenges of HTL discussed earlier. Higher concentrations of injection may increase some or all of these advantages: increased biocrude yield; decreased solids byproduct; decreased use of water; reduced plugging and reduced unwanted reactions: Byproduct solids are formed in the heater section which is where the plugging occurs, and $CO_2$ solvent reduces solid formation in this section. Additionally, the invention may aid in preventing plugging during the reactions that occur as biomass is preheated to reaction conditions.

A reduced solids yield will make liquid/liquid separation easier. The predominance of $CO_2$ in the product stream creates an opportunity for separations combined with staged pressure let-down as shown in FIG. 2. This is due to many factors, not least of which is the potential for significantly changing the density of the organic stream to make it easier to separate from the aqueous stream.

The predominance presence of $CO_2$ in the product stream allows for a staged separations train that takes advantage of the impacts of $CO_2$ solvent, which include but are not limited to the reduction of density of the oil phase, and potentially the ability to solvent extract and recover organic biocrude that is typically lost to both the solids byproduct and the aqueous byproduct. Another improvement of the invention is that the co-solvent is gas at ambient conditions. This overcomes the barriers to adoption of solvent HTL in that the separations and recovery of the solvent do not require the complex unit operations needed to recover organic solvents, such as distillation, and eliminates the economic costs of loss of solvent, as the process generates replacement solvent.

Additional advantages and novel features of the present invention will be apparent from the descriptions and demonstrations set forth herein. As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of." As is standard terminology, "systems" include to apparatus and materials (such as reactants and products) and conditions within the apparatus. All ranges are inclusive and combinable. For example, when a range of "1 to 5' is recited, the recited range should be construed as including ranges "1 to 4", "1 to 3", "1-2", "1-2 & 4-5", "1-3 & 5", "2-5", any of 1, 2, 3, 4, or 5 individually, and the like.

The following descriptions of the present invention should be seen as illustrative of the invention and not as limiting in any way.

DETAILED DESCRIPTION OF THE INVENTION

The following description provides a specific description of a continuous HTL process; the invention encompasses broader ranges of conditions. An aqueous slurry of biomass is pumped at 2800 psi through a preheater and then into a reactor at nominally 375° C., then through a pressure-let down unit where it is depressurized and separated into gas and liquid components. The gas comprises predominantly carbon dioxide, with some light hydrocarbons. The liquid comprises a separable biocrude and aqueous phase, of which the biocrude is retained and the aqueous is a side stream. The solid byproduct is separated mid-process prior to the depressurization unit, or it is filtered from the liquid product after depressurization. The resultant biocrude is a mixture of organic compounds containing predominantly carbon and hydrogen, with some oxygen. This biocrude is nominally an energy carrier, that can be catalytically upgraded to remove the oxygen through hydrogenation and form a side-product aqueous phase and a hydrocarbon that can be distilled into fractions similar to various transportation fuels.

Figure 1:
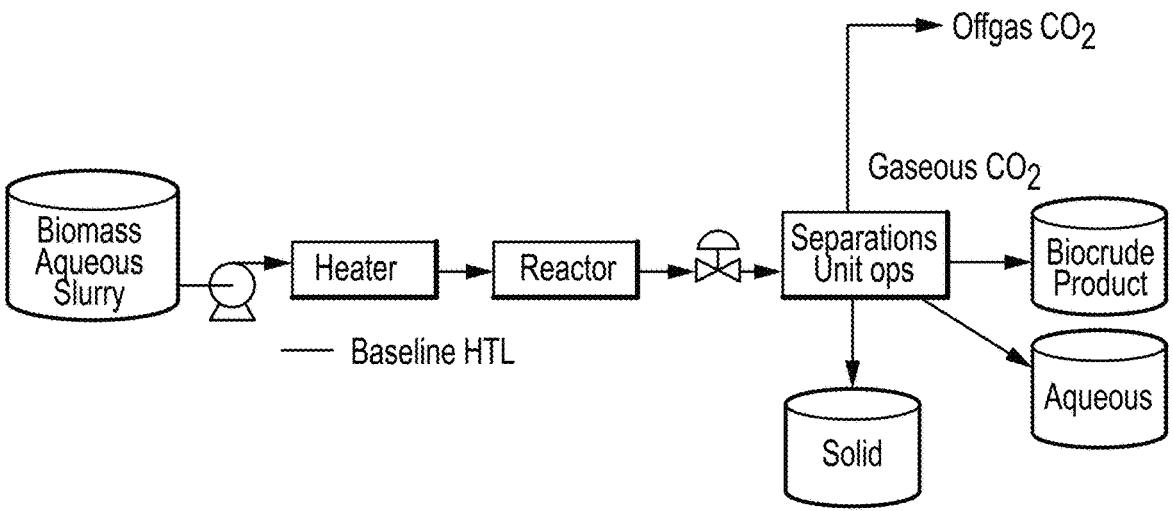
FIG. 1 is a flow diagram of baseline HTL.
Figure 2:
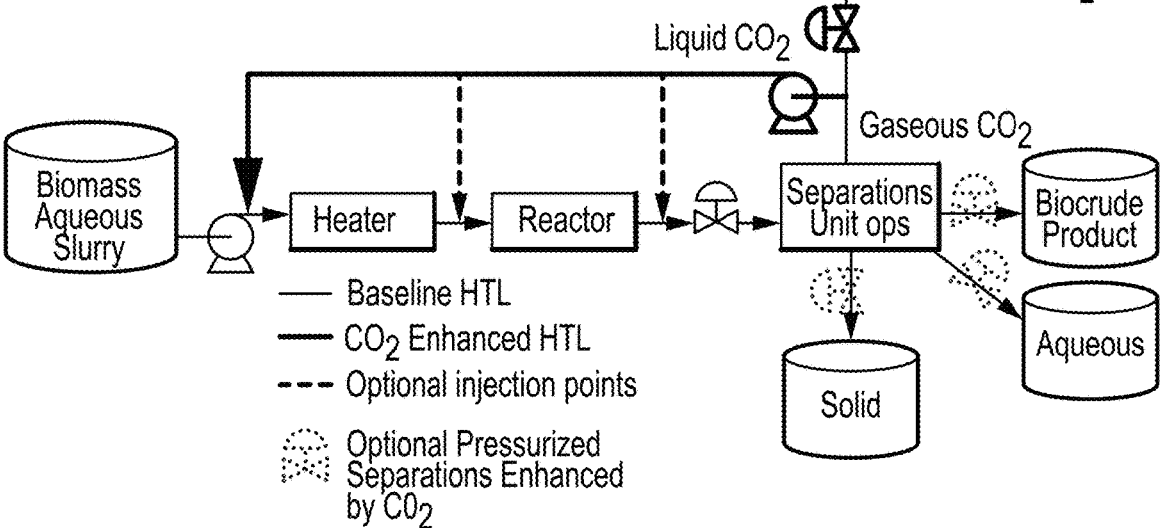
FIG. 2 is a flow diagram of carbon dioxide-enhanced HTL.

FIG. 1 shows a conceptual flowsheet of HTL and in FIG. 2, a loop is added as an example of $CO_2$ enhanced HTL. The aqueous slurry can comprise a range of biomass materials, including sewage sludge, food waste, algal biomass, agricultural residues, forest residues, or similar materials or combination of materials. The process is thought to be solvolytic, and the water plays the part of solvent, reaction media, and viscosity reducer. The water content is nominally held to as low a mass percentage as results in a pumpable slurry to and through the process.

In FIG. 1, the slurry is pumped to nominally 2800 psi to a heater. The heater may comprise various approaches to adding heat to the slurry including direct heating as well as recovery of heat from other parts of the process. The slurry is fed to the reactor at less than 374° C. at which point it is maintained at a temperature in the nominal range of 350° C. to 370° C. to allow the solvolytic reaction to occur. In some forms, the heater and reactor are the same tubing system, and the heater is merely considered the adiabatic section. The pressurized, heated, and reacted slurry exits the reactor, is cooled and depressurized, and the gas and liquids are separated. The gas can be released, while the liquids are subjected to further separation into aqueous and biocrude fractions. A byproduct solid is collected either from in process filtration following the reactor unit operation, or during filtration of the liquid products.

In the baseline, $CO_2$ is not available in meaningful amounts to participate in the chemistry occurring during the heat-up and the bulk of the reaction zone. As the baseline process generates a small amount of $CO_2$ in the reaction of biomass, a small amount of it is present in the reactor section, particularly towards the end of the reaction. In this invention, liquid and/or supercritical $CO_2$ is injected to participate as a co-solvent in the heater zone and/or throughout the reaction zone and/or prior to separations.

For this invention, the liquid $CO_2$ can be fed concurrently with the biomass prior to heating unit operations. Nominally, it would be fed to the system via a different high-pressure pump than is used to pump the biomass and the pressurized biomass and pressurized $CO_2$ would be fed into a single stream prior to entering the preheater at the beginning of the HTL process, which could be nominally 2800 psi and ambient temperature. In this case, the liquid $CO_2$ would mix with the biomass slurry and have the initial solvent effects of increasing biomass homogeneity as well as diluting the slurry, which would reduce its viscosity and make pumping the material easier in the parts of the HTL process where the biomass has a high viscosity. As the mixture increases in temperature through the heating section, the $CO_2$ transitions to supercritical, which further increases biomass homogeneity and reduces its density and yields different solvation effects. This viscosity modification of the feedstock by the co-solvent would also improve heat transfer, tend to solubilize compounds that would resist liquefaction, dilute and/or dissolve the reactive biomass that may result in plugging and solids formation during the heat up, and the additional solvent will reduce the tendency for inhomogeneity of the biomass. The heating phase of biomass from room temperature up to reaction temperature in HTL has been notorious for high viscosities, the potential for plugging and segregation, significant changes in rheology, and difficulty in transferring heat. The co-solvation by $CO_2$ reduces barriers in all of these areas but without the negative implication in cost and solvent recovery that organic solvent HTL must deal with.

In the reactor, the added $CO_2$ enables higher biocrude yield, and lower yield to byproduct solids. The dilutive impact of the solvent likely plays a similar role as it did in the heater section. Additionally, the acidic strength of $CO_2$ will also participate in the reaction of biomass as it converts it into the biocrude product.

Finally, in the separations train, the $CO_2$ will continue to benefit the process with its dilutive impact. If optional pressurized separation is practiced, reduced viscosity and density imparted by the dissolved $CO_2$ in the biocrude will make filtration and settling of byproduct solids easier. This is practiced in situ during HTL, and will be realized when adding $CO_2$ as a cosolvent to HTL without additional modification to in situ filtration of HTL solids. This same impact will result in easier liquid/liquid separations of the biocrude and aqueous phases, as the dissolved $CO_2$ will create a larger density disparity between the two phases, resulting in faster and cleaner separation. However, this benefit will only be realized if traditional HTL configurations are modified to allow for pressurized liquid/liquid separation prior to reducing the pressure where $CO_2$ is flashed.

If pressurized liquid/liquid separations is not practiced, $CO_2$ would be flashed from the process stream at the point of depressurization and liquid/liquid separations would be performed after $CO_2$ is flashed. The various streams (with the exception of the gas stream) would be relatively free of residual $CO_2$ solvent thereby reducing biocrude and organic loss to the aqueous solvent, particularly when $CO_2$ reduces the need for excess aqueous in the biomass feed.

As the HTL process generates some $CO_2$ from the biomass, the solvent is self-replenishing and the HTL process is already designed with gas/liquid separation capability and does not require extensive modification besides a system for compressing byproduct gas to be used as liquid (or supercritical) solvent. This fact allows the process to be run at very high concentrations of $CO_2$ co-solvent if the chemistry is beneficial, as negative impacts to process economics are very low compared to HTL with organic liquid cosolvents.

EXAMPLES

This invention was demonstrated in two continuous HTL experiments that were performed on subsequent days without and with carbon dioxide injection while maintaining similar reaction conditions and using the same batch of biomass feed. The experiment used an injection rate of 0.04:1 carbon dioxide to biomass volume ratio.

Figure 5:
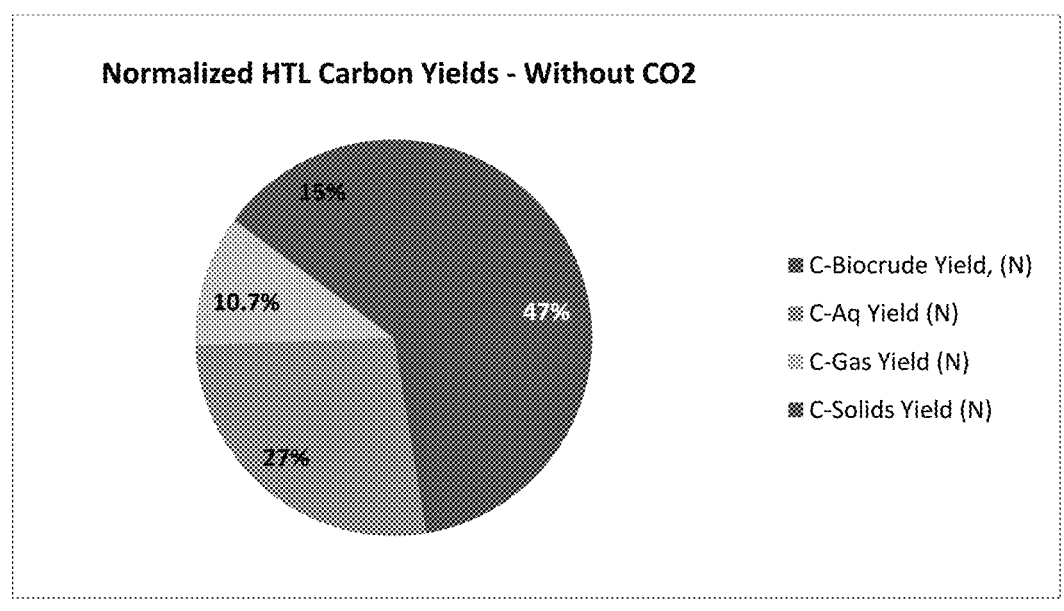
FIG. 5 is a pie chart showing normalized carbon yields without $CO_2$ (SS-1 experiment).
Figure 6:
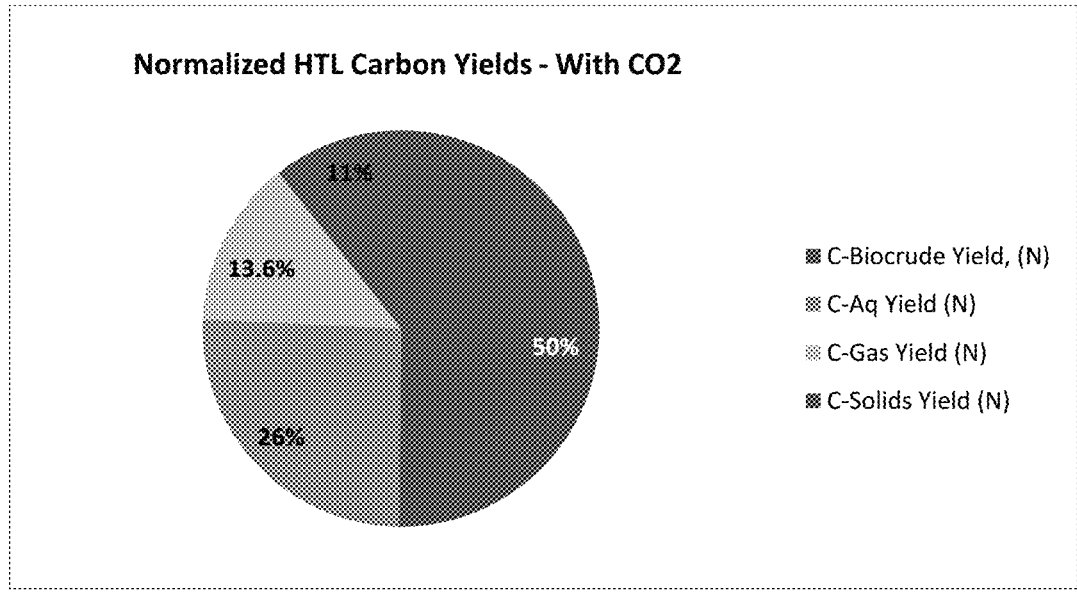
FIG. 6 is a pie chart showing normalized carbon yields with $CO_2$ (SS-2 experiment).

The feed comprised sewage sludge from a wastewater treatment plant at 0.75:1 ratio of primary to secondary sewage sludge. The feed was formatted by grinding the biomass in a ball mill with additional water to reduce particle size and diluting it to a pumpable slurry. This resulted in diluting it to ~17% weight percent solids and frozen until the experiments. Experiments were conducted on subsequent days in a continuous HTL system with identical configuration where the system was assembled, the baseline test was performed, the system was idled overnight, and then the test with carbon dioxide injection was performed while processing with the same operating conditions of the baseline. In, the second test (SS-2), liquid $CO_2$ was injected with the feed prior to the heater similar to the leftmost injection point in FIG. 2. The conditions and results are captured in Table 1.

the solids yield from 11% to 8%. To refine this further and eliminate the potential impact of diluents in the product and byproduct streams, the carbon yields are captured below to show where the biomass carbon is partitioning. The baseline HTL is shown in FIG. 5, which can be compared directly to the test with injection in FIG. 6. The comparison of carbon yield confirms a positive increase in partitioning of the carbon to the product biocrude phase, and away from the solid phase. The aqueous and gas yields do not demonstrate a meaningful difference, particularly due to excess $CO_2$ in the gas byproduct due to the injection.

What is claimed:

1. A method of producing liquid biocrude comprising:
   providing an aqueous biomass slurry comprising biomass and water;
   adding liquid $CO_2$ or supercritical $CO_2$ to the slurry to form a slurry with $CO_2$ cosolvent;
   heating and pressurizing the slurry;

TABLE 1

| Conditions tested for baseline HTL (SS-1) and $CO_2$ Enhanced HTL (SS-2) | | | |
|---|---|---|---|
| Test | | SS-1 (baseline) | SS-2 (with $CO_2$) |
| Biomass Feed Rate | mL/h | 4000 | 4000 |
| Carbon dioxide liquid feed rate | mL/h @ ~2900 psig, ~20° C. | 0 | 140 |
| Reactor Temperature | ° C. | 322 | 327 |
| Pressure | psig | 2935 | 2943 |
| TOS (continuous) | hour | 1.33 | 1.00 |
| Total Solids in Feed | wt % | 18.9% | 19.1% |
| Ash in Dry Feed | wt % | 30.7% | 30.3% |
| Ash in Slurry Feed | wt % | 5.8% | 5.8% |
| AF Solids in Slurry Feed | wt % | 13.1% | 13.3% |
| Average Feed density | g/ml @20° C. | 1.04 | 1.04 |
| Mass Yields (Dry, Ash Free, Normalized) | | | |
| Mass Balance (normalized) | % | 103% | 105% |
| Biocrude Yield, Mass | $g_{oil}/g_{fd}$ | 34% | 39% |
| Biocrude Yield, Carbon | % | 48% | 51% |
| Aq Yield, Mass | $g_{aqu}/g_{fd}$ | 37% | 33% |
| Aq Yield, Carbon | % | 27% | 25% |
| Solid Yield, Mass | $g_{solid}/g_{fd}$ | 11% | 8% |
| Gas Yield, Mass | $g_{gas}/g_{fd}$ | 18% | 19% |

In the SS-1 experiment, 4000 ml/h of biomass was fed to the HTL reactor in a baseline configuration and samples and measurements were taken normally. In the SS-2 experiment, the process was performed nearly identically except that liquid $CO_2$ was injected at 140 ml/h and 2943 psi into the line with the biomass prior to the heater. The $CO_2$ was obtained from a cylinder with a liquid dip-tube. The experiment simulated full first-pass recycle of $CO_2$ gas back to the process as liquid $CO_2$. The pressurized liquid $CO_2$ injected into SS-2 represented approximately 65 L/h of $CO_2$ gas, which is nominally similar to the 55 L/h of gas produced during SS-1, which was comprised 90.6% $CO_2$ and the balance light hydrocarbons. Note that a purge of offgas shown in FIG. 2 could be required because both the liquid $CO_2$ and the $CO_2$ produced by reaction would be present at the completion of the reaction. This allows for much higher concentrations of liquid $CO_2$ to be used as an HTL co-solvent as the process operates at a surplus of $CO_2$.

Figure 3:
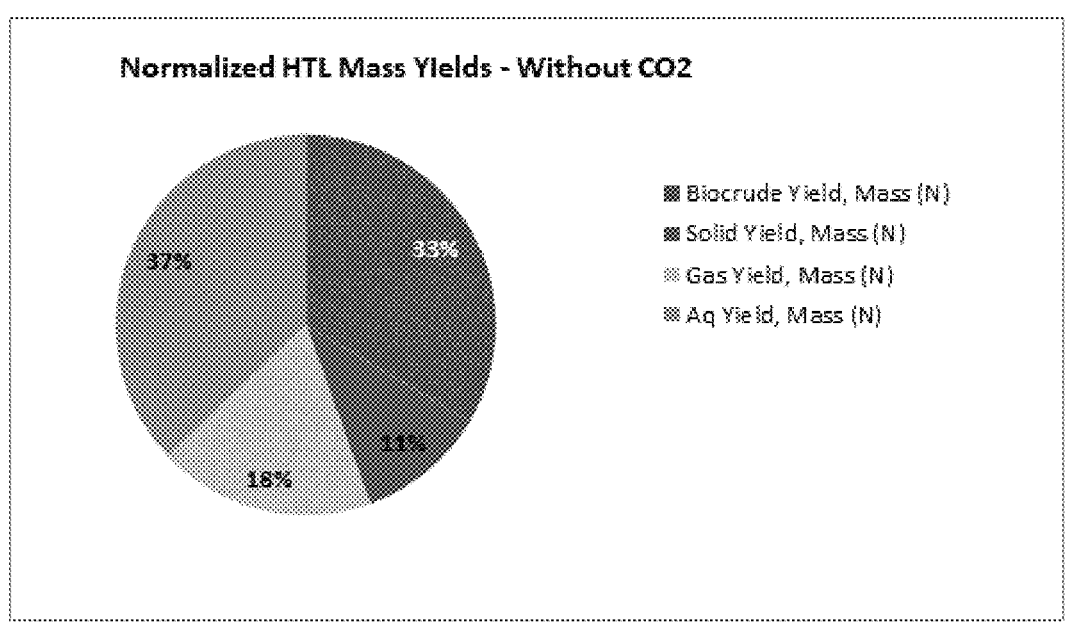
FIG. 3 is a pie chart showing normalized mass yields without $CO_2$ (SS-1 experiment).
Figure 4:
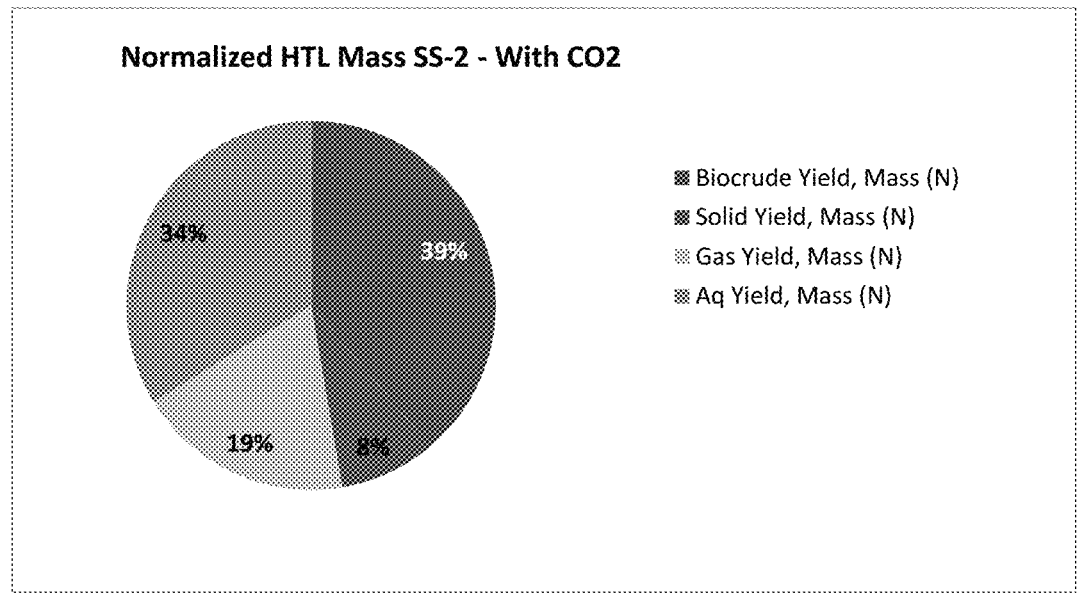
FIG. 4 is a pie chart showing normalized mass yields with $CO_2$ (SS-2 experiment).

This test demonstrated that applying the invention of HTL with co-solvent $CO_2$ increased the biocrude yield and decreased the byproduct solids yield. Baseline results are shown in FIG. 3, which can be directly compared with the yields from a repeat of that test with $CO_2$ injection shown in FIG. 4. Thus, $CO_2$ injection results in increasing the mass yield of product biocrude from 33% to 39%, and decreased reacting the slurry in a HTL process in the presence of the $CO_2$ cosolvent under conditions where the $CO_2$ cosolvent is in the form of a liquid or is supercritical;
   forming a product mixture from the step of reacting;
   cooling the product mixture to form a cooled product mixture;
   subjecting the cooled product mixture to a separation process; and
   recovering a liquid product from the separation process.

2. The method of claim 1 wherein the biomass comprises sewage sludge, food waste, algal biomass, wet agricultural residues, or a combination of these materials.

3. The method of claim 1 wherein the method comprises a preheating step followed by a passing the preheated solution into a reactor where the step of reacting occurs.

4. The method of claim 3 wherein the liquid or supercritical $CO_2$ is added to the slurry after the preheating step and before the reacting step.

5. The method of claim 4 wherein the pressure in the reactor is in the range of 5 to 25 MPa.

6. The method of claim 1 wherein separation process comprises a step of removing products in a stream of liquid $CO_2$ or supercritical $CO_2$; and wherein the stream of liquid $CO_2$ or supercritical $CO_2$ comes from the HTL process.

7. The method of claim 1 wherein the pressure in the reactor is at least 10 MPa, or in the range of 10 to 100 MPa, or 10 to 50 MPa, or 12 to 30 MPa, or 13 to 20 MPa, or 10 to 15 MPa.

8. The method of claim 1 where the step of reacting is conducted in the range of 300 to 370° C. or 350 to 370° C. or 300 to 330° C.

9. The method of claim 1 wherein the aqueous biomass slurry comprises at least 5 wt % biomass, or in the range of 5 to 50 wt % biomass, or 10 to 30 wt % biomass, or 15 to 25 wt % biomass.

10. The method of claim 1 wherein the mass of added liquid CO2 is at least 1.1 times to 4 times the mass of $CO_2$ that is generated in the method.

11. The method of claim 1 wherein the separation process comprises a step of $CO_2$ gas removal wherein at least 1% (or at least 3%, or at least 5%) of carbon in the added $CO_2$ is present in the liquid product after the step of $CO_2$ gas removal.

12. The method of claim 1 wherein the preheating is conducted in a vessel that is separate from a vessel where the slurry is reacted in the HTL process, and wherein the preheating is conducted to a temperature of at least 150° C. or at least 200° C.

13. The method of claim 1 wherein liquid $CO_2$ is dispersed in the aqueous slurry.

14. The method of claim 1 wherein the mass ratio of the added liquid $CO_2$ or supercritical $CO_2$ to the slurry is at least 0.01 or at least 0.03 or at least 0.05 and is 0.5 or less or 0.3 or less, or 0.1 or less.

15. The method of claim 1 wherein the biocrude yield is at least 30%; or wherein the solids yield is 10% or less.

16. The method of claim 1 wherein, as compared to a process that does not add $CO_2$ but is otherwise identical, the biocrude yield increases by at least 5% or at least 10% (for example, instead of 30 wt % yield, at least 33 wt % biocrude yield), or in the range of 5 to 20 to 5 to 15% increase, Likewise, the method can be characterized by any of these increases relative to an identical method conducted in the presence of an atmosphere of $CO_2$ but no liquid or supercritical $CO_2$.

17. The method of claim 1 wherein, as compared to a process that does not add $CO_2$ but is otherwise identical, the solids yield decreases by at least 5% or at least 10%, or in the range of 5 to 30 to 5 to 20% decrease, Likewise, the method can be characterized by any of these decreases relative to an identical method conducted in the presence of an atmosphere of $CO_2$ but no liquid or supercritical $CO_2$.

18. The method of claim 3 wherein the aqueous slurry is mechanically stirred in a preheater section prior to passage into a HTL reactor.

\* \* \* \* \*